(12) United States Patent
Egalon

(10) Patent No.: US 12,372,704 B2
(45) Date of Patent: Jul. 29, 2025

(54) SYSTEMS AND METHODS OF SIDE ILLUMINATION OF WAVEGUIDES

(71) Applicant: Claudio Oliveira Egalon, Volta Redonda (BR)

(72) Inventor: Claudio Oliveira Egalon, Volta Redonda (BR)

(*) Notice: Subject to any disclaimer, the term of this patent is extended or adjusted under 35 U.S.C. 154(b) by 0 days.

(21) Appl. No.: 17/769,606

(22) PCT Filed: Dec. 9, 2020

(86) PCT No.: PCT/US2020/064053
§ 371 (c)(1),
(2) Date: Apr. 15, 2022

(87) PCT Pub. No.: WO2021/119153
PCT Pub. Date: Jun. 17, 2021

(65) Prior Publication Data
US 2022/0299696 A1    Sep. 22, 2022

Related U.S. Application Data

(60) Provisional application No. 62/945,584, filed on Dec. 9, 2019.

(51) Int. Cl.
*G02B 6/26* (2006.01)
*F21V 8/00* (2006.01)
*G01M 11/02* (2006.01)

(52) U.S. Cl.
CPC ....... *G02B 6/0028* (2013.01); *G01M 11/0207* (2013.01); *G02B 6/262* (2013.01)

(58) Field of Classification Search
CPC ..................................... G02B 6/262

USPC .......................................... 385/147
See application file for complete search history.

(56) References Cited

U.S. PATENT DOCUMENTS

| 4,898,444 A | * | 2/1990 | Grimes | G02B 6/2852 385/31 |
| 5,231,642 A | * | 7/1993 | Scifres | H01S 5/423 372/50.11 |
| 5,262,638 A | | 11/1993 | Egalon | |

(Continued)

FOREIGN PATENT DOCUMENTS

| CA | 2992213 A1 | 4/2018 |
| CN | 110231714 A | 9/2019 |

(Continued)

OTHER PUBLICATIONS

International Preliminary Report on Patentability dated Apr. 21, 2022, for related International Application No. PCT/US2020/064053.

(Continued)

*Primary Examiner* — Kaveh C Kianni
(74) *Attorney, Agent, or Firm* — ArentFox Schiff LLP; Bruce D. Jobse; Marlo S. Grolnic

(57) ABSTRACT

Systems and methods of side coupling, side illumination or side injection (as opposed to axial coupling, illumination, or injection) of a waveguide are disclosed. More particularly, it relates to increased coupling, by orders of magnitude, and, consequently, increased transmission, along a waveguide, of any wave by side coupling, side illumination, or side injection.

6 Claims, 9 Drawing Sheets

(56) References Cited

U.S. PATENT DOCUMENTS

| | | | |
|---|---|---|---|
| 5,894,535 A * | 4/1999 | Lemoff | G02B 6/4246 |
| | | | 385/47 |
| 8,463,083 B2 * | 6/2013 | Egalon | G01N 21/76 |
| | | | 385/12 |
| 8,909,004 B2 | 12/2014 | Egalon | |
| 9,291,568 B2 | 3/2016 | McCaffrey et al. | |
| 10,088,410 B2 | 10/2018 | Egalon | |
| 10,203,504 B1 * | 2/2019 | Saarikko | G02B 27/0172 |
| 10,564,417 B2 * | 2/2020 | Danziger | G02B 27/0081 |
| 2004/0086223 A1 * | 5/2004 | Young | G02B 6/0001 |
| | | | 385/33 |
| 2004/0109642 A1 * | 6/2004 | Parikka | G02B 6/43 |
| | | | 385/13 |
| 2005/0220386 A1 * | 10/2005 | Nakada | G02B 6/4214 |
| | | | 385/14 |
| 2008/0267245 A1 * | 10/2008 | Tanaka | G02B 6/001 |
| | | | 359/623 |
| 2009/0054263 A1 | 2/2009 | Pawlak et al. | |
| 2010/0202726 A1 * | 8/2010 | Egalon | G02B 6/00 |
| | | | 385/12 |
| 2012/0040470 A1 * | 2/2012 | Dorn | B01L 3/502 |
| | | | 422/402 |
| 2013/0039050 A1 | 2/2013 | Dau | |
| 2014/0146979 A1 * | 5/2014 | Puskarich | H04R 5/033 |
| | | | 381/74 |
| 2014/0206061 A1 * | 7/2014 | Lim | C07K 14/00 |
| | | | 530/395 |
| 2015/0176132 A1 * | 6/2015 | Hundley | G02B 1/12 |
| | | | 428/116 |
| 2019/0285897 A1 * | 9/2019 | Topliss | G02B 27/0172 |
| 2019/0317340 A1 * | 10/2019 | McDonald | G02F 1/0147 |
| 2020/0409156 A1 * | 12/2020 | Sissom | G02B 6/0065 |
| 2021/0030959 A1 | 2/2021 | Huang et al. | |
| 2022/0034457 A1 | 2/2022 | Lambooij et al. | |
| 2022/0291451 A1 * | 9/2022 | Bulu | G02B 6/3849 |

FOREIGN PATENT DOCUMENTS

| | | | | |
|---|---|---|---|---|
| JP | 02141640 A | | 5/1990 | |
| JP | 2009-25210 A | | 2/2009 | |
| JP | 4581135 B2 | * | 11/2010 | G01N 21/553 |
| JP | 2013-113890 A | | 6/2013 | |
| KR | 20210072123 A | * | 11/2010 | |
| WO | 2011119104 | | 9/2011 | |
| WO | 2011119104 A1 | | 9/2011 | |
| WO | 2017061448 A1 | | 4/2017 | |
| WO | 2018/065975 A1 | | 4/2018 | |
| WO | 2019178060 A1 | | 9/2019 | |

OTHER PUBLICATIONS

Statement of Substance of the Interview dated Jul. 26, 2022, for related International Application No. PCT/US2020/064053.

Pulid, et al. "Multiple fluorescence sensing with side-pumped tapered polymer fiber," Sensors and Actuators B 157 (2011) 560-564. 5 pages.

* cited by examiner

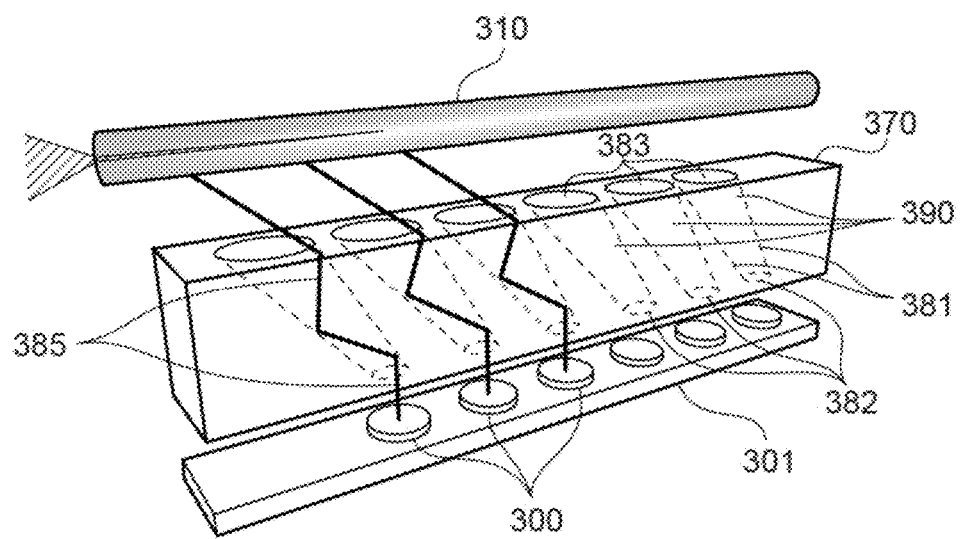
*Figure 7*
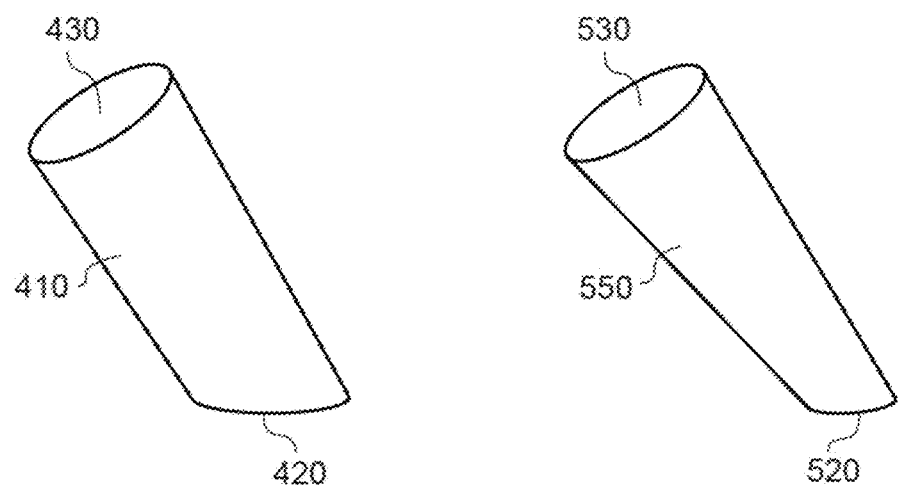
*Figure 8A*   *Figure 8B*

SYSTEMS AND METHODS OF SIDE ILLUMINATION OF WAVEGUIDES

This application is a national stage application, filed under 35 U.S.C. § 371, of International Patent Application No. PCT/US2020/064053, filed on Dec. 9, 2020, which claims priority to U.S. Provisional Application Ser. No. 62/945,584, filed Dec. 9, 2019. All extrinsic materials identified herein are incorporated by reference in their entirety.

FIELD OF THE INVENTION

The field of the invention relates generally, to side coupling, side illumination or side injection (as opposed to axial coupling, illumination, or injection) of a waveguide. More particularly, it relates to increased coupling and, consequently, increased transmission, along a waveguide, of any wave by side coupling, illumination, or injection. Furthermore, this invention relates to increased signal transmission, by side coupling, along their respective waveguides, of the following waves:
 a. Electromagnetic waves, such as radio wave, microwave, infrared, visible light, ultraviolet, x-rays and gamma rays.
 b. Acoustic waves such as sound, infrasound and ultrasound.
 c. Matter waves; and
 d. Any other type of wave.

BACKGROUND

The background description includes information that may be useful in understanding the present invention. It is not an admission that any of the information provided herein is prior art or relevant to the presently claimed invention, or that any publication specifically or implicitly referenced is prior art.

Presently, lateral, or side, illumination of waveguides, such as optical fibers, is typically done at 0 degrees angle in relation to the normal of the side surface of waveguide. However, such type of illumination can cause only a small fraction of the light to be injected and transmitted along the waveguide resulting in (1) short propagation lengths (e.g., at most 2 meters), (2) optical fiber sensors with low signal, and consequently, poor sensitivity and resolution, and (3) low efficiency couplers and others.

Little work has been done on side illuminated optical fibers and side illuminated waveguides in general. Egalon (U.S. Pat. Nos. 8,463,083; 8,909,004 and 10,088,410) discloses a side illuminated optical fiber. Pulido and Esteban (C. Pulido, 0. Esteban, "Multiple fluorescence sensing with lateral tapered polymer fiber", Sensors and Actuators B, 157 (2011), pp. 560-564) disclose a side illuminated fluorescent cladding optical fiber. A goniometer was used to determine the angle of illumination at which the coupled fluorescence is higher. Finally, Grimes et al. (U.S. Pat. No. 4,898,444) discloses a first fiber used to illuminate a second fiber laterally using a junction media to minimize losses due to Fresnel reflections.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Although these references contribute to the field of side illuminated waveguides, there remains a need for improved systems and methods of coupling into a waveguide by side illumination.

Various objects, features, aspects and advantages of the inventive subject matter will become more apparent from the following detailed description of embodiments, along with the accompanying drawing figures in which like numerals represent like components.

SUMMARY OF THE INVENTION

The inventive subject matter provides apparatus, systems, and methods in which the amount of light coupled into a waveguide (e.g., an optical fiber) by side illumination is increased by several fold. Experiments performed with side illumination determined that it is possible to increase this amount by up to 100-fold if the side illuminated angle, with respect to the normal of the side surface of the waveguide, is very steep. The following advantages have been recognized:
 a. Higher coupling efficiency results in longer propagation lengths along the fiber;
 b. Optical fiber sensors with higher sensitivity and better resolutions;
 c. Higher efficiency side illuminated couplers; and
 d. Simpler configuration that requires no lenses to inject light.

Additionally, increasing the coupling efficiency, can provide the following benefits:
 i. It would be possible to use inexpensive light sources with lower intensity in conjunction with waveguides devices in general such as fiber sensors and couplers;
 ii. A larger spectrum of applications of side illuminated waveguides becomes available such as applications that require long distance propagation of the light along the waveguide; and
 iii. Increased coupling efficiency results in a larger signal which requires a less sensitive, lower cost, detection system.

Thus, the embodiments of this invention provide a side illuminated waveguide that is simpler and carry more light than prior art. These and other benefits of one or more aspects becomes apparent from a consideration of the ensuring description and accompanying drawings.

For the sake of brevity, and for the case of this document, the following terms are being used in their respective broader sense:
 a. Light is defined as being any type of wave: electromagnetic wave; acoustic wave;
 matter wave or any other type.
 b. Fiber optics is defined as being any type of waveguide structure that can guide a wave. In the case of matter waves, a laser beam can also be considered a waveguide as well since it can trap and guide matter waves along its length.
 c. Lateral surface of a waveguide refers to a surface that is parallel to the overall propagation of the wave inside the waveguide.
 d. Terminal ends of the waveguide refers to the surface of the waveguide that is perpendicular to the overall propagation of the wave inside the waveguide.
 e. The term "side illumination" is used as a synonym to lateral illumination, lateral coupling, side coupling and side injection of any type of wave into any type of waveguide. Also, side illumination is referred as illumination of the lateral surface of a waveguide. Side illumination stands in contrast to axial illumination which is illumination of the terminal ends of a waveguide.

The following is a summary of the embodiments described and shown herein:

a. A first embodiment shown in FIG. 1 describes a collimated light from a light source, such as a laser, that propagates through an unbound medium (air, vacuum, water, etc.) towards a collection waveguide. The light is incident at the side surface of the collection waveguide at angles as high as 85 degrees with respect to the normal of the waveguide surface, although lower angles can still produce acceptable results.

b. A second embodiment uses a light source, not necessarily collimated, that emits light that propagates through a hole, or tunnel, drilled through a strip, from the light source towards the surface of a collection waveguide. This hole guides the light and can make angles as high as 85 degrees with respect to the normal of the waveguide surface, although lower angles can still produce acceptable results. The cross section of the hole can be either uniform or tapered along its length and can have any geometry: it can be a cylindrical hole with a circular cross section as shown in FIG. 6, a rectangular cross section, a cross section made of a regular or irregular polygon etc. The tapered hole, as the name implies, should preferably have a cross sectional dimension that increases from the light source towards the side surface of the collection waveguide: the waveguide that is being side illuminated. A conical hole drilled through a strip as shown in FIG. 7 is an example of this tapered geometry with the smaller diameter facing the light source and the larger diameter facing the side surface of the collection waveguide. Other cross-sectional geometries are also acceptable. The inner walls of the hole, or tunnel, can be either polished or coated with a reflecting material to increase the amount of light that is guided towards the collection waveguide that is being side illuminated. In all these cases the hole or tunnel should make an angle with the normal of the side surface of the collection waveguide as high as 85 degrees.

c. A third embodiment uses a second waveguide, an illumination waveguide, to guide the light from the light source towards the collection waveguide as shown in FIGS. 9-10. This illumination waveguide is deployed in the oblique direction to make a steep angle with respect to the normal of the side surface of the collection waveguide. The illumination waveguide can have cross sections similar to the holes of the previous item: either an uniform cross section (like in a cylindrical fiber) or a cross section dimension that increases from the light source towards the surface of the collection waveguide, like a conical fiber. The surface of the illumination waveguide can also be coated with a reflecting material to increase the amount of light that is guided from the source to the side surface of the collection waveguide that is being illuminated. The proximal end of the illumination waveguide, facing the light source, should preferably be tangent to the surface of the source whereas the terminal end, facing the collection waveguide, should preferably be perpendicular to the axis of the illumination waveguide.

d. A fourth embodiment uses an upright illumination waveguide, to guide the light from the light source towards the collection waveguide as shown in FIGS. 12-13. This illumination waveguide has a terminal end that makes an angle with the horizontal to redirect the light from the source at a steeper angle towards the collection waveguide. This configuration has the advantage of occupying less longitudinal space than the configurations of the oblique waveguide and holes (items b and c above).

e. A fifth embodiment integrates the characteristics of the third and fourth configurations: oblique illumination waveguide with terminal end at an angle as shown in FIGS. 15-16.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 7 is a perspective view of an embodiment of a strip having conical holes to illuminate a collection waveguide.

FIG. 8A is an illustration of an embodiment of oblique cylindrical illumination waveguide.

FIG. 8B is an illustration of an embodiment of an oblique conical illumination waveguide.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
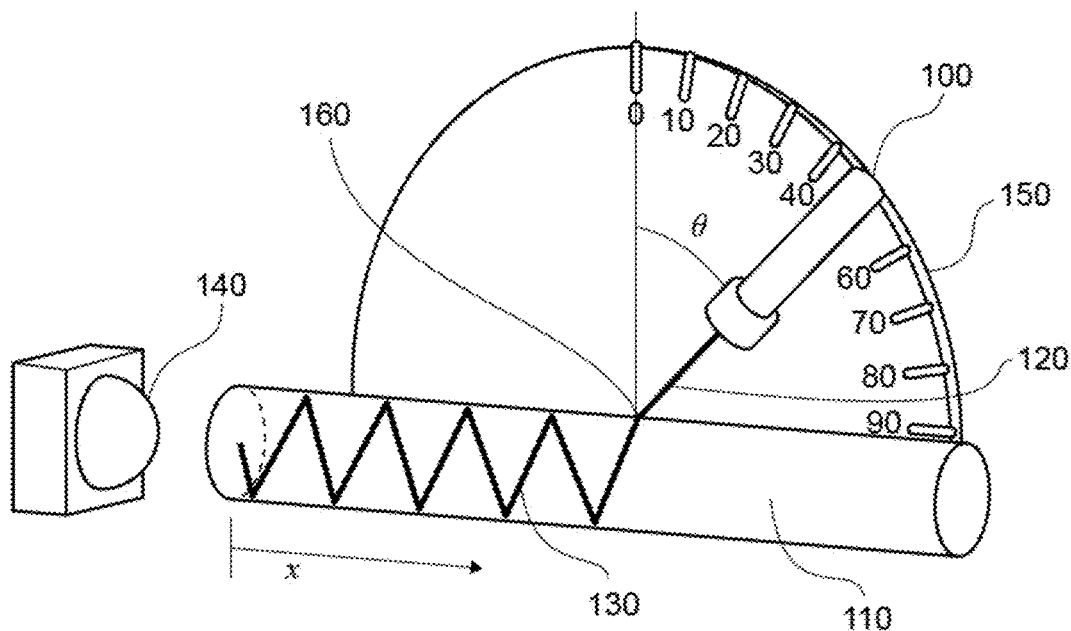
FIG. 1 is perspective view of an embodiment of a light source, such as a laser pointer, illuminating a collection waveguide with a collimated light beam. The light source is mounted over a goniometer and can illuminate the collection waveguide at different angles, θ, and positions, x.

FIG. 1 shows an embodiment of the inventive subject matter. Accordingly, a light source 100, illuminates the side surface of a collection waveguide 110 with a collimated light beam 120. A fraction of collimated light beam 120 is coupled into collection waveguide 110 as collected light beam 130, and such collected light beam 130 is guided towards the tip of collection waveguide 110 where a photo detector 140 measures the light intensity of collected light beam 130.

As shown in FIG. 1, collection waveguide 110 can be cylindrical. However, it is contemplated that collection waveguide 110 can have a tapered geometry (e.g., a cylindrical body having a diameter that reduces along its length). It is contemplated that collection waveguide 110 can be an optical fiber or any other structure of any material capable of receiving and guiding waves (e.g., electromagnetic wave, an acoustic wave, or a particle wave). Similarly, the light source can be the source of any type of wave whether it is an electromagnetic wave, an acoustic wave, or a particle wave. Additionally, although light beam 120 is shown in FIG. 1, any type of wave (e.g., electromagnetic wave; acoustic wave; matter wave or any other type) is contemplated.

Figure 2:
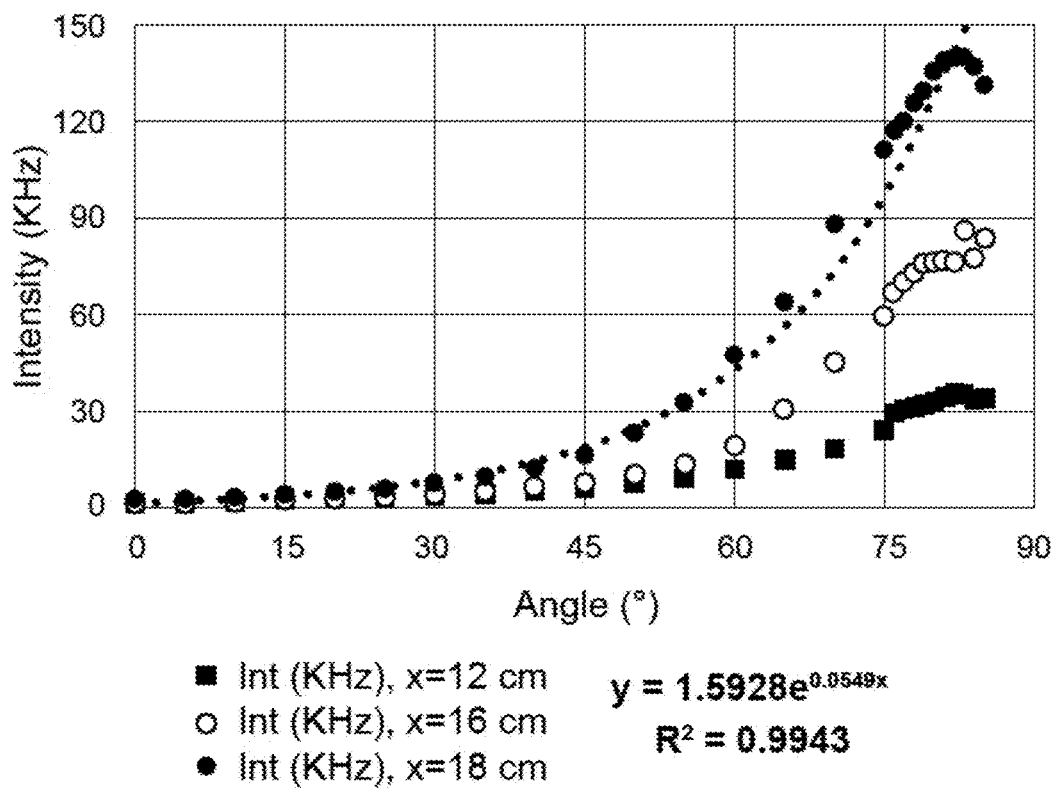
FIG. 2 is a plot of the light intensity against the angle of illumination, θ, with respect to the normal of the collection waveguide surface for three different positions, x, along the collection waveguide, according to the setup of FIG. 1, but with the collection waveguide having a tapered geometry. The positions, x, are measured with respect to the tip, or end, of collection waveguide closest to the photodetector. In all cases, there is an exponential increase, up to a certain angle, of the intensity with respect to the angle which can also depend on the tapering angle of the waveguide at the point of illumination.

Light source 100 is mounted over a goniometer 150 capable of positioning light source 100 to illuminate collection waveguide 110 at different angles, θ. Goniometer 150 can be used to determine the illumination angle that couples the most amount of light into collection waveguide 110. As shown in FIG. 1, the point of illumination 160 of collection waveguide 110 coincides with the axis of goniometer 150. Although light beam 120 is shown as illuminating collection waveguide at an illumination angle, θ, of 50 degrees, it is contemplated the illumination angle is between 1 and 89 degrees, and more preferably 40 and 60 degrees. In embodiments having collection waveguide 110 that is tapered, it should be appreciated that the exact angle is dependent (1) upon the tapering angle of the collection waveguide at the point of illumination, and (2) the practicality of illuminating the collection waveguide at steep angles FIG. 2 shows a series of experimental results obtained with goniometer of FIG. 1. Accordingly, a tapered collection waveguide, in this case, an optical fiber, was illuminated at several different angles and at three different positions: x=12 cm; x=16 cm and x=18 cm. As shown in FIG. 1, the position, x, is measured from the end of collection waveguide 110 that is closest to photo detector 140 to a position (e.g., 12 cm, 16 cm, 18 cm, etc.) along the length of collection waveguide 100. The data collected shows that the angle of maximum coupling into the collection waveguide, $\theta_{max}$, is around 83 degrees. A theoretical model of this configuration shows that this angle of maximum coupling varies for different tapering angles of a side illuminated collection waveguide: in other words, it is a function of the angle with respect to the normal of the side surface of the collection waveguide at the point of illumination. FIG. 2 also shows that the increase in signal is exponential up to the angle of maximum coupling.

Figure 3:
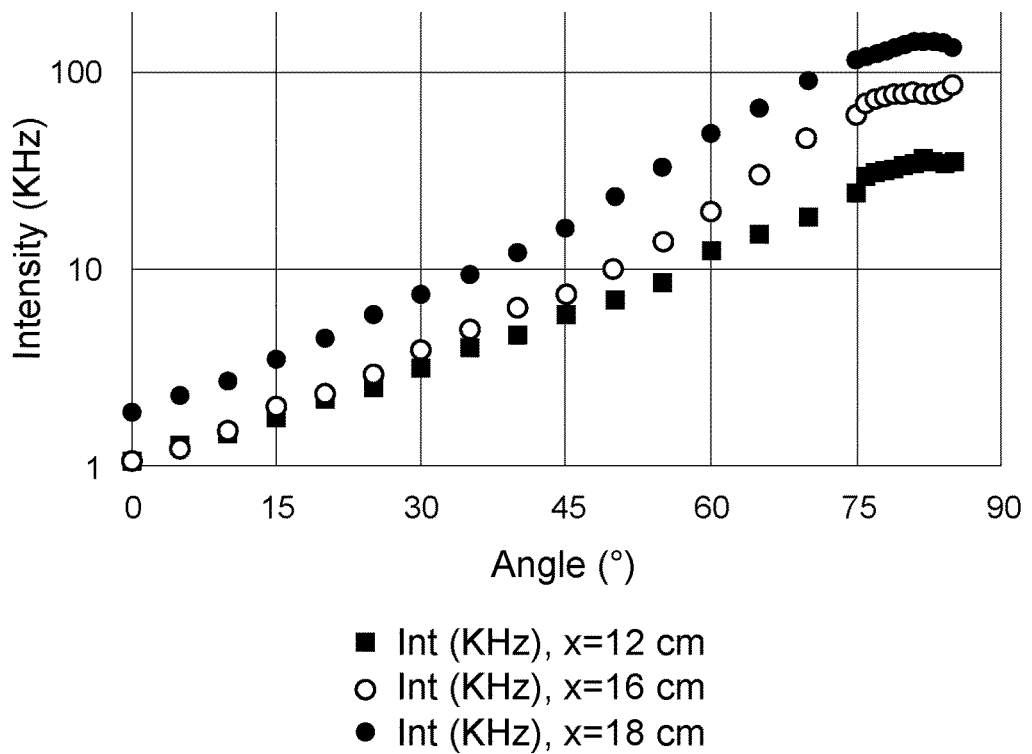
FIG. 3 is a plot of the plot shown in FIG. 2 in the log scale.

FIG. 3 displays the same data of FIG. 2 with the intensity axis in the logarithmic scale to illustrate the apparent linear increase of the intensity in this scale confirming its exponential increase with the angle.

Figure 4:
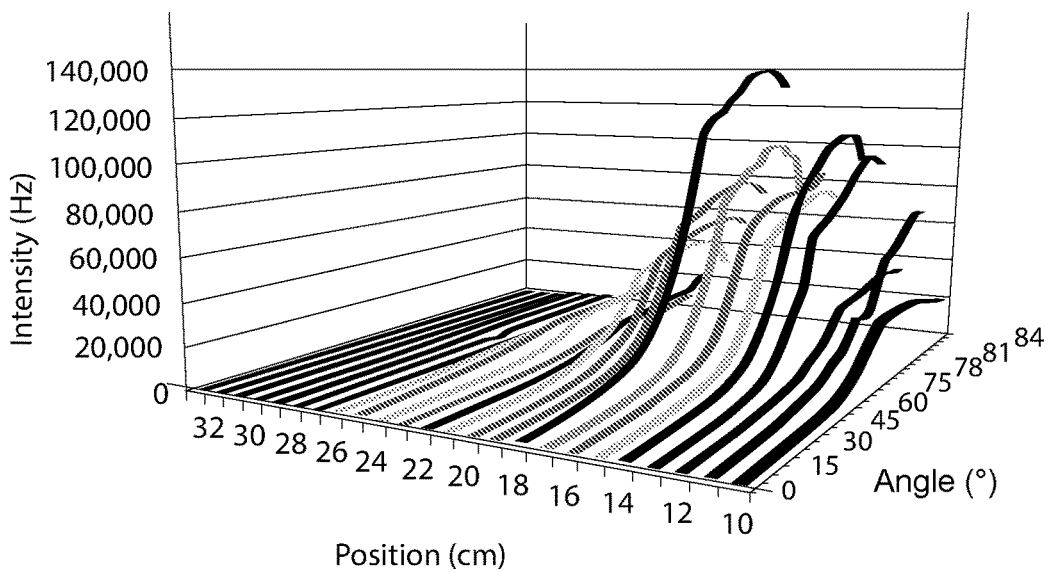
FIG. 4 is a plot of the intensity against the angle of illumination and the position along the collection waveguide, according to the setup of FIG. 1, but with the collection waveguide having a tapered geometry.

FIG. 4 displays the intensity against the position, x, and the angle of illumination. The highest intensity, $I_{max}$, is 139,320 Hz and occurs at position x=18 cm and an angle of illumination, $\theta_{max}$, of 83 degrees.

Figure 5:
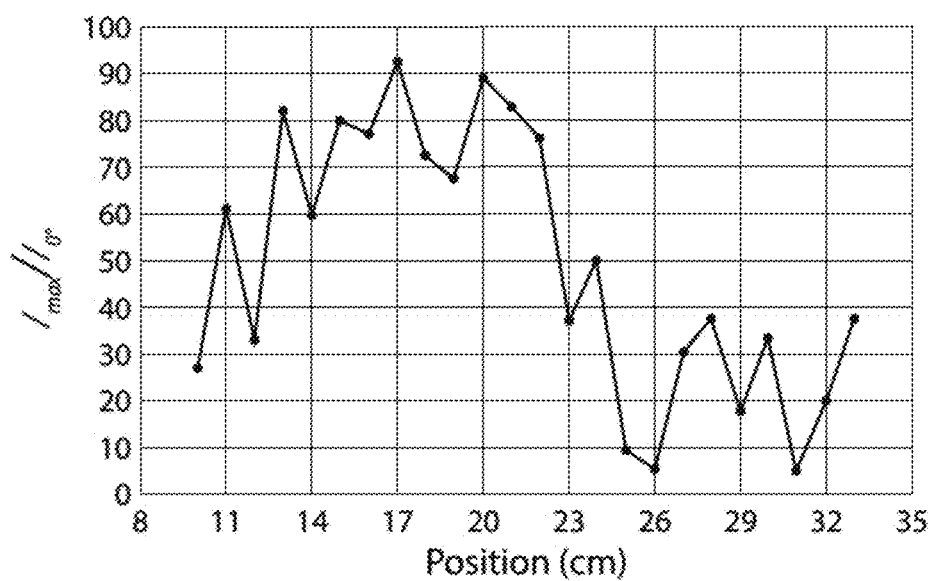
FIG. 5 is a plot of the ratio between the maximum intensity, $I_{max}$, and the intensity at a zero-degree angle of illumination, $I_0$, for a given position x, or $I_{max}/I_{0o}$.

FIG. 5 is a plot of the ratio between the maximum intensity, $I_{max}$, at each position of illumination x, and the intensity at zero-degree angle (or normal illumination), $I_{0°}$, $I_{max}/I_0$. According to this data, the three largest ratios occur at positions 17 cm, 20 cm and 13 cm, with values of 92.56, 89.06 and 82.11, respectively: almost 100-fold. These distinct variations are due to the different tapering angles found along the collection waveguide.

Figure 6:
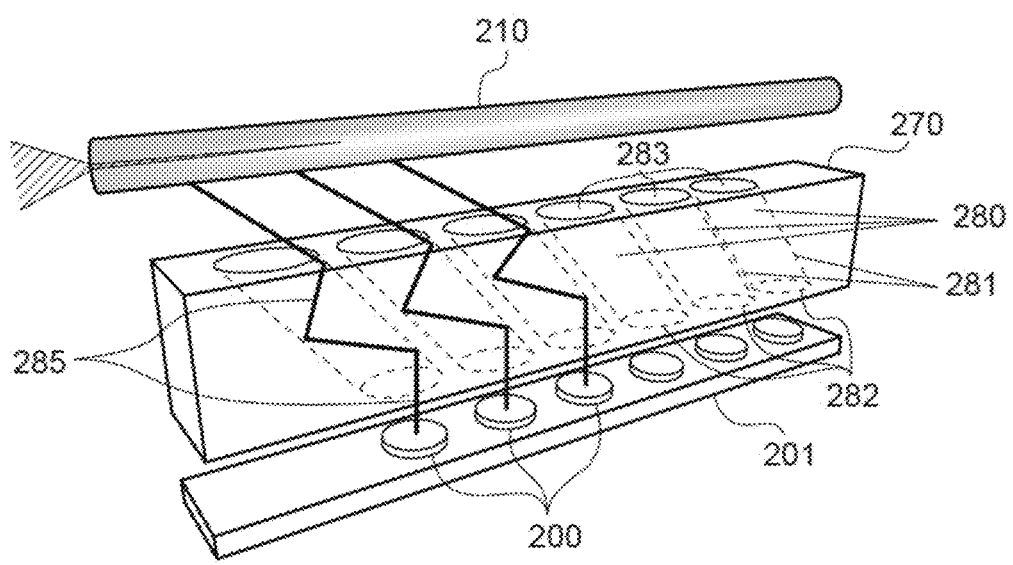
FIG. 6 is a perspective view of a strip containing cylindrical holes each at a specific angle to illuminate a collection waveguide.

FIG. 6 is a perspective view of a strip 270 that can be used to side illuminate a collection waveguide 210 at pre-determined angles. Strip 270 comprises several cylindrical holes 280 at a specific angle. Each of cylindrical holes 280 is designed to carry light 285 from a respective light source 200 through a first end 282 to a second end 283 where light 285 is delivered to a collection waveguide 210. Light sources 200 are mounted on a support 201 forming array of light sources 200. It is contemplated that the inner wall 281 of each of cylindrical holes 280 is preferably polished or coated with a reflecting surface to better guide light 285 from its respective light source 200 to collection waveguide 210.

As illustrated in FIGS. 2, 3 and 4, in general, the steeper the angle of illumination, θ, with respect to the normal of the collection waveguide axis, the higher the coupling into the collection waveguide. In this case, although the angles of each of cylindrical holes 280 are illustrated to be the same, it is contemplated that different angles can be provided. Additionally, or alternatively, it is contemplated that the angle of illumination, θ, provided by cylindrical holes 280 is between 1 and 89 degrees, and more preferably, between 40 and 60 degrees.

FIG. 7 shows an embodiment of a strip 370 having conical holes 390 diverging from their respective light sources 300 towards a collection waveguide 310. It should be appreciated that conical holes 390 are a better alternative to cylindrical holes 280 because of their ability to increase the collimation of light 385 from light source 300. As shown in FIG. 7, the diameter of conical holes 390 increases from a first end 382 to a second end 383. Light sources 300 are mounted on a support 301 forming array of light sources 300. It is contemplated that the inner wall 381 of each of conical holes 390 is preferably polished or coated with a reflecting surface to better guide light 385 from its respective light source 300 to collection waveguide 310.

FIG. 8A illustrates an oblique cylindrical illumination waveguide (e.g., optical fiber) 410 and FIG. 8B shows an oblique conical illumination waveguide (e.g., optical fiber) 550. Their proximal ends, 420 and 520, faces a light source whereas their terminal ends, 430 and 530, faces a collection waveguide. In both cases, proximal ends, 420 and 520, are polished, and either parallel or tangent to the surface of a light source, to increase light collection from the light source: in other words, the proximal end does not have to be flat necessarily. On the other hand, terminal ends, 430 and 530, are perpendicular to the axis of the illumination waveguide axis to minimize the amount of Fresnel reflections that decrease the output of the illumination waveguide towards a collection waveguide.

Figure 9:
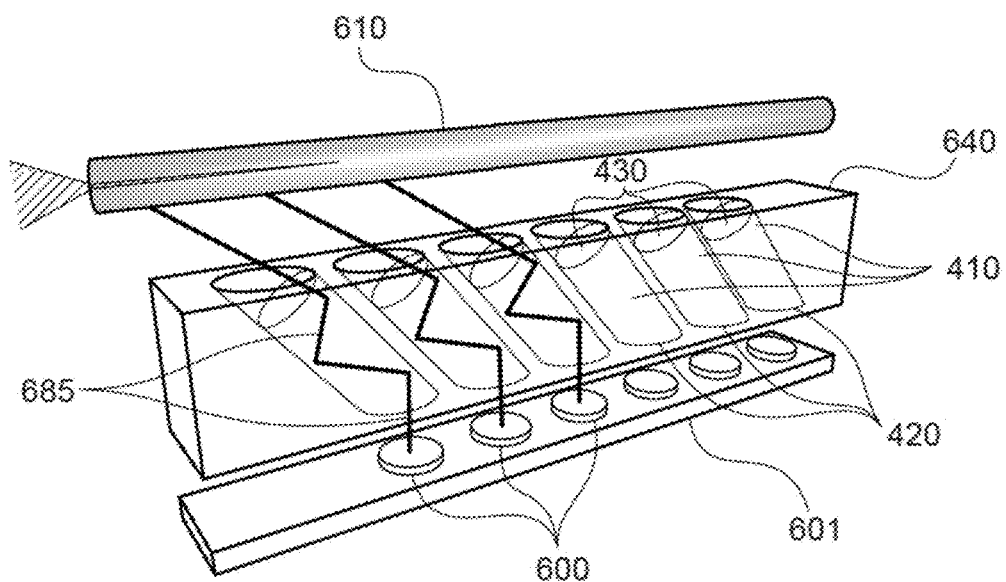
FIG. 9 is a perspective view of a support containing oblique cylindrical illumination waveguides.

FIG. 9 shows oblique cylindrical illumination waveguides, 410, of FIG. 8A installed inside a support 640 to illuminate a collection waveguide 610. Cylindrical illumination waveguides 410 are deployed at a pre-determined angle with respect to a side surface of collection waveguide 610 to increase the amount of light 685 coupled into collection waveguide 610. It is contemplated that the pre-determined angle is between 1 and 89 degrees, and more preferably between 40 and 60 degrees. Light 685 is shown to propagate from a light source 600, through cylindrical illumination waveguide 410 to finally reach collection waveguide 610. It is contemplated that the angle of illumination, θ, is between 1 and 89 degrees, and more preferably, between 40 and 60 degrees.

Figure 10:
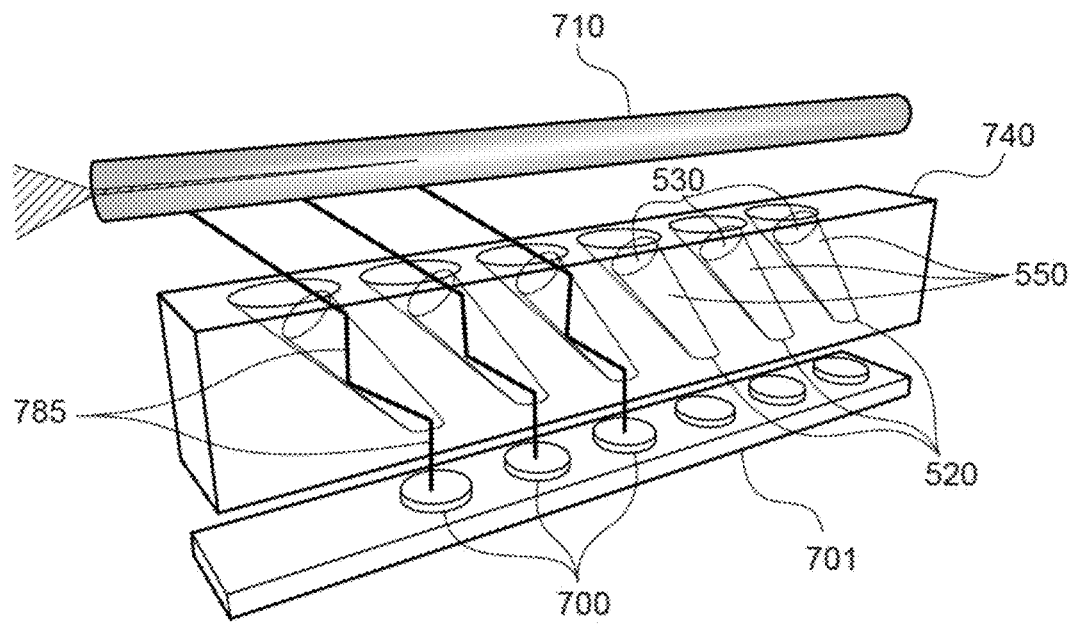
FIG. 10 is a perspective view of support containing oblique illumination conical waveguides.

FIG. 10 shows the oblique conical illumination waveguide 550 of FIG. 8B installed in a support 740. Conical illumination waveguides 550 are deployed at a pre-determined angle with respect to a side surface of collection waveguide 710 to increase the amount of light 785 coupled into collection waveguide 710. It is contemplated that the pre-determined angle is between 1 and 89 degrees, and more preferably between 40 and 60 degrees. Conical illumination waveguides 550 are used to illuminate a collection waveguide 710 at a favorable angle of illumination, θ. It is contemplated that the angle of illumination, θ, is between 1 and 89 degrees, and more preferably, between 40 and 60 degrees. As described earlier, the conical geometry of conical illumination waveguides 550 help collimate light 785 from a light source 700.

Figure 11A:
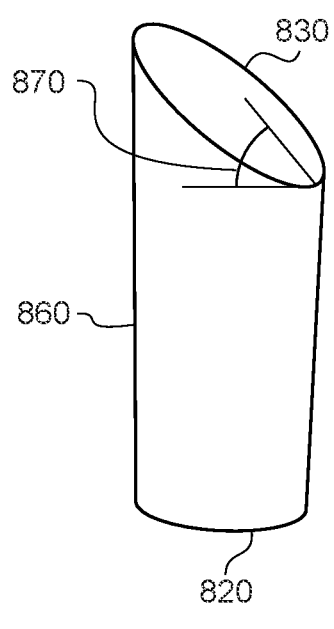
FIG. 11A is an illustration of an upright cylindrical illumination waveguide.
Figure 11B:
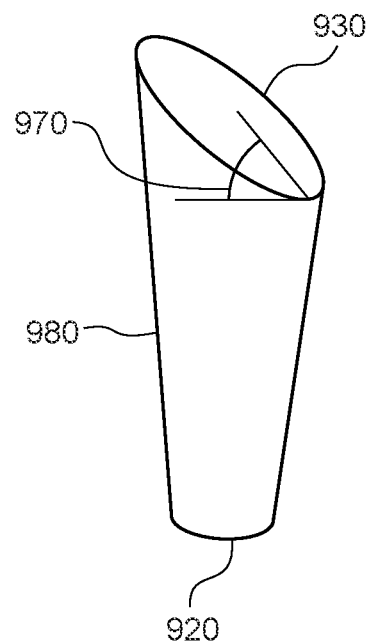
FIG. 11B is an upright conical illumination waveguide.

FIG. 11A illustrates an upright cylindrical illumination waveguide (e.g., optical fiber) 860 and FIG. 11B illustrates an upright conical waveguide (e.g., optical fiber) 980. These waveguides have respective terminal ends 830 and 930 that makes an angle with a horizontal plane. This feature is designed to refract the illumination light towards a pre-determined angle with respect to the normal of the surface of a collection waveguide. This angle, reference numerals 870 and 970, should be steep enough to produce a high angle of incidence with respect to the normal of the surface of the collection waveguide and yet shallow enough to prevent total internal reflection of the illumination light at the interface of respective terminal ends 830 and 930. The maximum angle of reference numerals 870 and 970 depends on (1) the refractive index of illumination waveguides 860 and 980, and (2) the angle of incidence of illumination light at terminal ends 830 and 930. For a refractive of index of 1.5 and angle of incidence of illumination light parallel to the axis of the illumination waveguides 860 and 980, it is contemplated that the angle of reference numerals 870 and 970 should not exceed 41.8 degrees.

It should be appreciated that an upright illumination waveguide is advantageous because a smaller support can be used compared to corresponding supports of FIGS. 6, 7, 9 and 10 due to the upright nature of the upright illumination waveguides.

Figure 12:
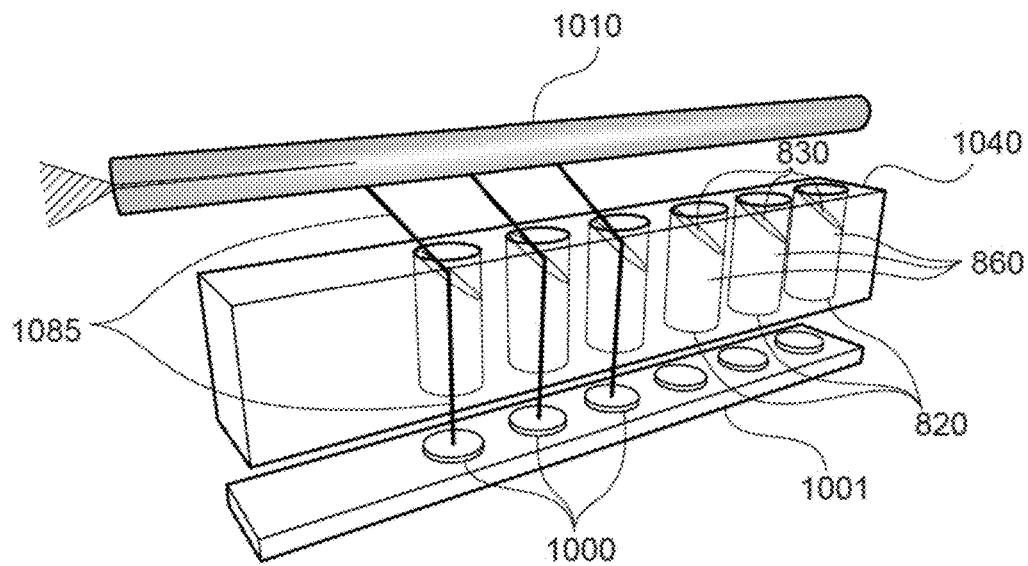
FIG. 12 is a perspective view of a support containing several upright cylindrical illumination waveguides.
Figure 13:
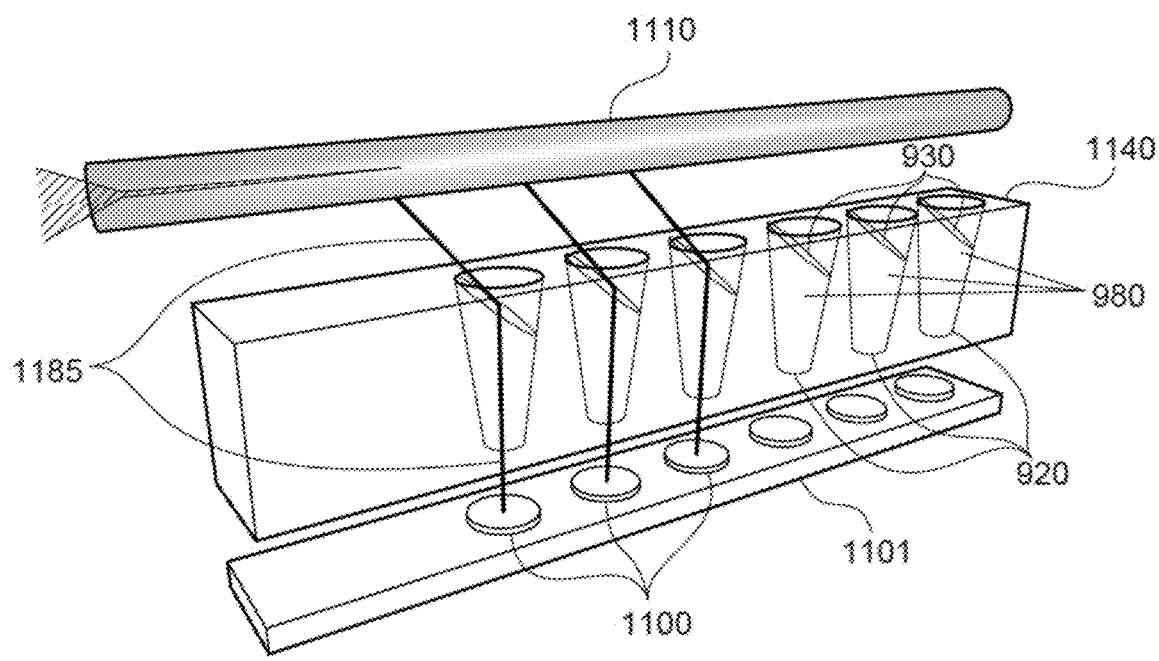
FIG. 13 is a perspective view of a support containing several upright conical illumination waveguides.

FIGS. 12 and 13 show the installation of the illumination waveguides 860 and 980 in their respective supports, 1040 and 1140. As shown in FIGS. 12 and 13, light 1085 and 1185 initially propagates along the axis of the respective illumination waveguides (860 and 980) from a light source 1000 and 1100 to terminal ends 830 and 930 where it is deflected away of this direction and towards a collection waveguide 1010 and 1110 producing illumination at a pre-determined angle of illumination, θ. It is contemplated that this angle of illumination, θ, is between 1 and 89 degrees, and more preferably, between 40 and 60 degrees.

Figure 14A:
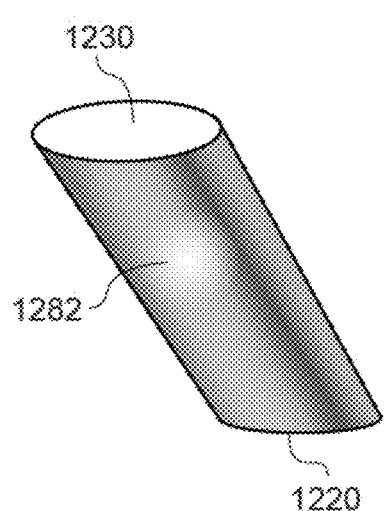
FIG. 14A is an illustration of a cylindrical illumination optical waveguide.
Figure 14B:
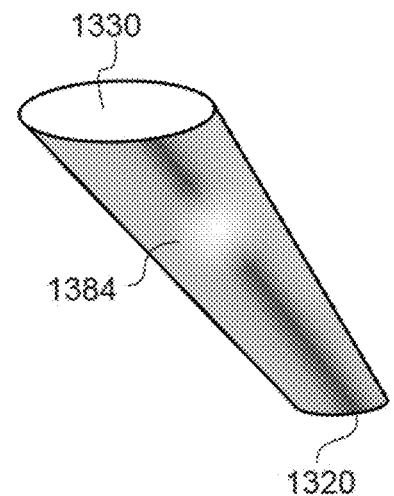
FIG. 14B illustrates a conical illumination waveguide.

FIGS. 14A and 14B illustrate a different configuration of illumination waveguides (e.g., optical fibers), 1282 and 1384, that combine the features of the oblique and upright optical fibers of FIGS. 8A-B and 11A-B, respectively. The hybrid configuration combines the oblique configuration and proximal ends, 1220 and 1320, of the waveguides of FIGS. 8A-B, and the angular terminal ends, 1230 and 1330, of FIGS. 11A-B to further increase the angle of illumination of a collection waveguide.

Figure 15:
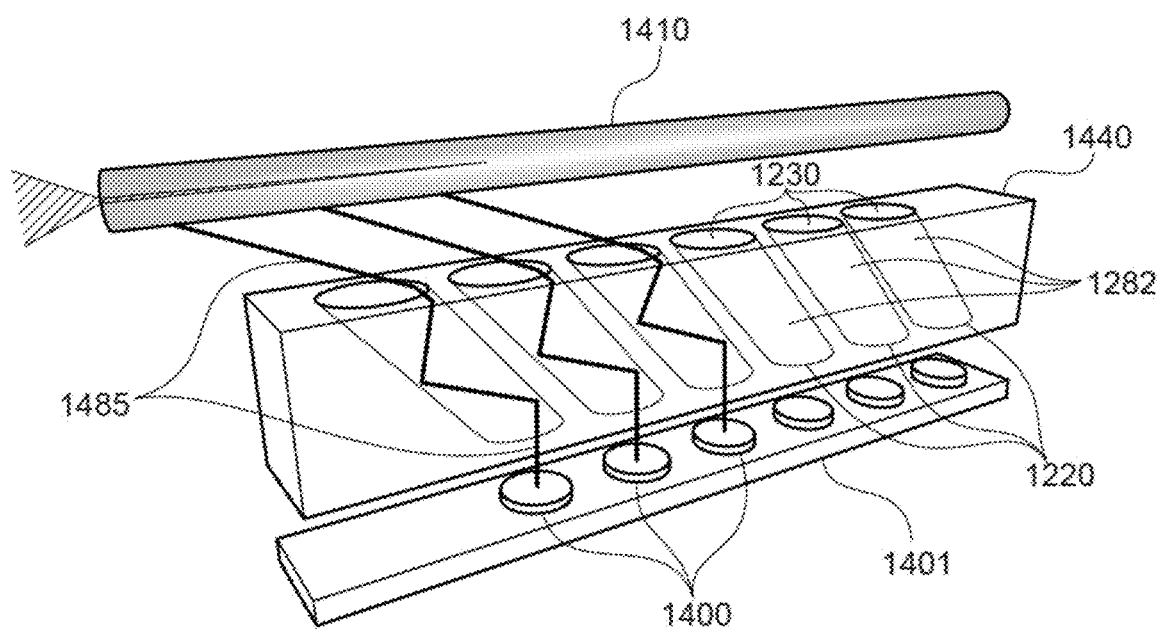
FIG. 15 is a perspective view of a support containing cylindrical illumination waveguides of FIG. 14A.
Figure 16:
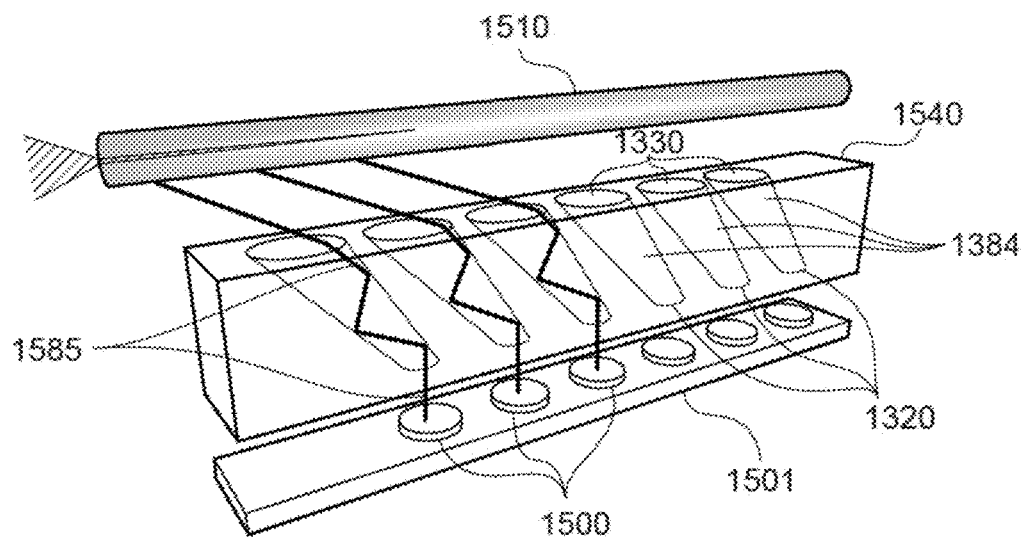
FIG. 16 is a perspective view of a support containing conical illumination waveguides of FIG. 14B.

FIGS. 15 and 16 show illumination waveguides 1282 and 1384 installed inside their respective supports, 1440 and 1540, and the behavior of their respective illumination light 1485 and 1585. In these illustrations, light 1485 and 1585:

a. Propagates from a light source 1400 and 1500;

b. Is incident at the proximal ends 1220 and 1320 of the illumination waveguides 1282 and 1384 at an angle between 0 and 89 degrees, and more preferably an angle between 40 and 60 degrees, with respect to proximal ends 1220 and 1320, respectively;

c. Propagates through the illumination waveguides 1282 and 1384 towards the terminal ends 1230 and 1330; and d. Is refracted at an angle of illumination, between 1 and 89 degrees, and more preferably an angle between 40 and 60 degrees, with respect to the normal direction of the surface of collection waveguides 1410 and 1510 towards the surface of collection waveguides 1410 and 1510.

Figure 17:
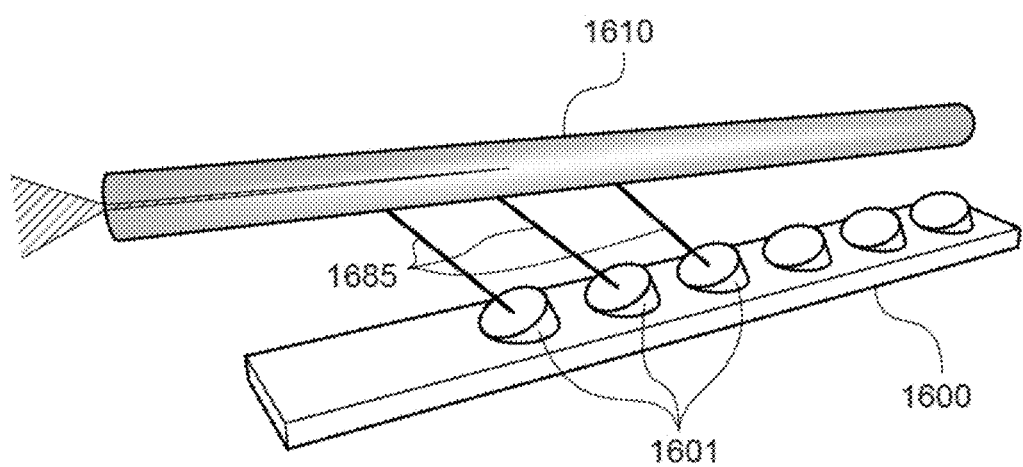
FIG. 17 illustrates an array of light sources mounted at a fixed angle to illuminate a collection waveguide at a predetermined angle.

FIG. 17 illustrates an embodiment of an inclined light source, 1601, directly illuminating a collection waveguide, 1610. It should be appreciated that this configuration obviates the need of supports in other embodiments. It is contemplated that inclined light sources 1601 can be installed over a printed circuit board. Inclined light sources 1601 are mounted at a fixed angle to illuminate collection waveguide 1610 with light 1685 at a pre-determined angle of illumination, θ. It is contemplated that this angle of illumination, θ, is between 1 and 89 degrees, and more preferably, between 40 and 60 degrees. It should be appreciated that light 1685 is transmitted through an unbound medium. Contemplated unbound mediums include, but are not limited to, air, a vacuum, and water.

In all illustrations, although light from the source is shown to be collimated, this is not a requirement for the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A system for coupling a beam of light into a collection waveguide having a side surface disposed between first and second ends, the system comprising:

at least one light source configured to generate the beam;

a device configured to orient the beam towards the side surface of the collection waveguide at an angle off normal; and a detector at one of the first and second ends of the collection waveguide, the detector configured to detect the beam exiting from the one of the first and second ends;

wherein said device comprises at least one hole extending through the device between a first surface adjacent the collection waveguide and a second surface opposite the first surface, the at least one hole extending at an angle relative to the first surface and configured to orient the beam toward the collection waveguide at the angle off normal.

2. The system of claim 1, wherein the beam comprises any of an electromagnetic wave, an acoustic wave or a particle wave.

3. The system of claim 1, wherein the collection waveguide is either a cylindrical optical fiber or a tapered optical fiber diverging toward the detector.

4. The system of claim 1, wherein the at least one hole is configured to orient the beam toward the collection waveguide at the angle off normal to increase the coupling of the beam into the collection waveguide.

5. The system of claim 1, wherein the at least one hole is filled with an illumination waveguide configured to guide the beam of light towards the collection waveguide.

6. The system of claim 1, wherein an inner wall of the at least one hole is polished or coated with a reflecting material to guide the beam of light towards the collection waveguide.

* * * * *

UNITED STATES PATENT AND TRADEMARK OFFICE
CERTIFICATE OF CORRECTION

| | |
|---|---|
| PATENT NO. | : 12,372,704 B2 |
| APPLICATION NO. | : 17/769606 |
| DATED | : July 29, 2025 |
| INVENTOR(S) | : Claudio Oliveira Egalon |

It is certified that error appears in the above-identified patent and that said Letters Patent is hereby corrected as shown below:

On the Title Page

Item (72) Inventor address should read -- Volta Redonda, RJ (BR) --

In the Specification

In Column 3, Line 13, "drilled through a strip" should read -- drilled through a support --

In Column 3, Lines 27-28, "A conical hole drilled through a strip" should read -- A conical hole drilled through a support --

In Column 4, Lines 38-39, "a strip containing cylindrical holes" should read -- a support containing cylindrical holes --

In Column 4, Lines 41-42, "a strip having conical holes" should read -- a support having conical holes --

In Column 6, Lines 17-18, "a strip 270 that can be used to side illuminate" should read -- a support 270 that can be used to side illuminate --

In Column 6, Line 19, "Strip 270 comprises" should read -- Support 270 comprises --

In Column 6, Line 41, the phrase "a strip 370 having conical holes" should read -- a support 370 having conical holes --

Signed and Sealed this
Second Day of September, 2025

Coke Morgan Stewart
*Acting Director of the United States Patent and Trademark Office*